(12) United States Patent
Ando et al.

(10) Patent No.: US 7,991,885 B2
(45) Date of Patent: Aug. 2, 2011

(54) REMOTE OPERATION SYSTEM, SERVER, REMOTELY OPERATED DEVICE, REMOTE OPERATION SERVICE PROVIDING METHOD

(75) Inventors: Tomohito Ando, Tokyo (JP); Junichi Funada, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 12/599,320

(22) PCT Filed: May 8, 2008

(86) PCT No.: PCT/JP2008/058533
§ 371 (c)(1),
(2), (4) Date: Nov. 9, 2009

(87) PCT Pub. No.: WO2008/140011
PCT Pub. Date: Nov. 20, 2008

(65) Prior Publication Data
US 2010/0241693 A1   Sep. 23, 2010

(30) Foreign Application Priority Data
May 9, 2007   (JP) ................................ 2007-124400

(51) Int. Cl.
*G06F 15/173* (2006.01)
*G06F 15/16* (2006.01)
*G06F 19/00* (2011.01)
(52) U.S. Cl. .......................... 709/224; 709/229; 700/245
(58) Field of Classification Search .................. 709/201, 709/202, 217–219, 223, 224, 226, 229; 700/245, 700/258, 901
See application file for complete search history.

(56) References Cited

U.S. PATENT DOCUMENTS
2003/0195659 A1* 10/2003 Kasuga et al. ................ 700/245
2007/0150104 A1*  6/2007 Jang et al. .................... 700/245

FOREIGN PATENT DOCUMENTS
| JP | 11-259566 A | 9/1999 |
|----|-------------|--------|
| JP | 2002085353 A | 3/2002 |
| JP | 2002101333 A | 4/2002 |
| JP | 2002354551 A | 12/2002 |
| JP | 2003006532 A | 1/2003 |
| JP | 2003030480 A | 1/2003 |
| JP | 2004013275 A | 1/2004 |

(Continued)

OTHER PUBLICATIONS

International Search Report for PCT/JP2008/058533 mailed Jun. 10, 2008.
H. Kato, "Secure Tele-operation Protocol for the Firewall in the Control System", Transactions of Information Processing Society of Japan, vol. 43, No. 8, Aug. 15, 2002, vol. 43, p. 2555(4.3.1).

(Continued)

*Primary Examiner* — Yemane Mesfin

(57) ABSTRACT

A remote operation robot system for having a robot perform a task by remote operation includes an operating device connected to a communication network, an operating terminal connected to the network, and a server. The operated device performs the task in accordance with a remote operation via the communication network. The operating terminal operates the operated device via the communication network. The server holds operated side information about a request, from a device user of the operated device, to have the task performed. The server holds operating side information about a request, from a terminal operator of the operating terminal, to perform the task. The server determines a combination of the operated device and the operating terminal that operates the operated device based on the operated side information and the operating side information, and notifies the operated device and the operating terminal of the combination.

14 Claims, 11 Drawing Sheets

FOREIGN PATENT DOCUMENTS

| | | | |
|---|---|---|---|
| JP | 2004017186 A | | 1/2004 |
| KR | 2003075084 A | * | 9/2003 |
| WO | 2005043433 A | | 5/2005 |

* cited by examiner

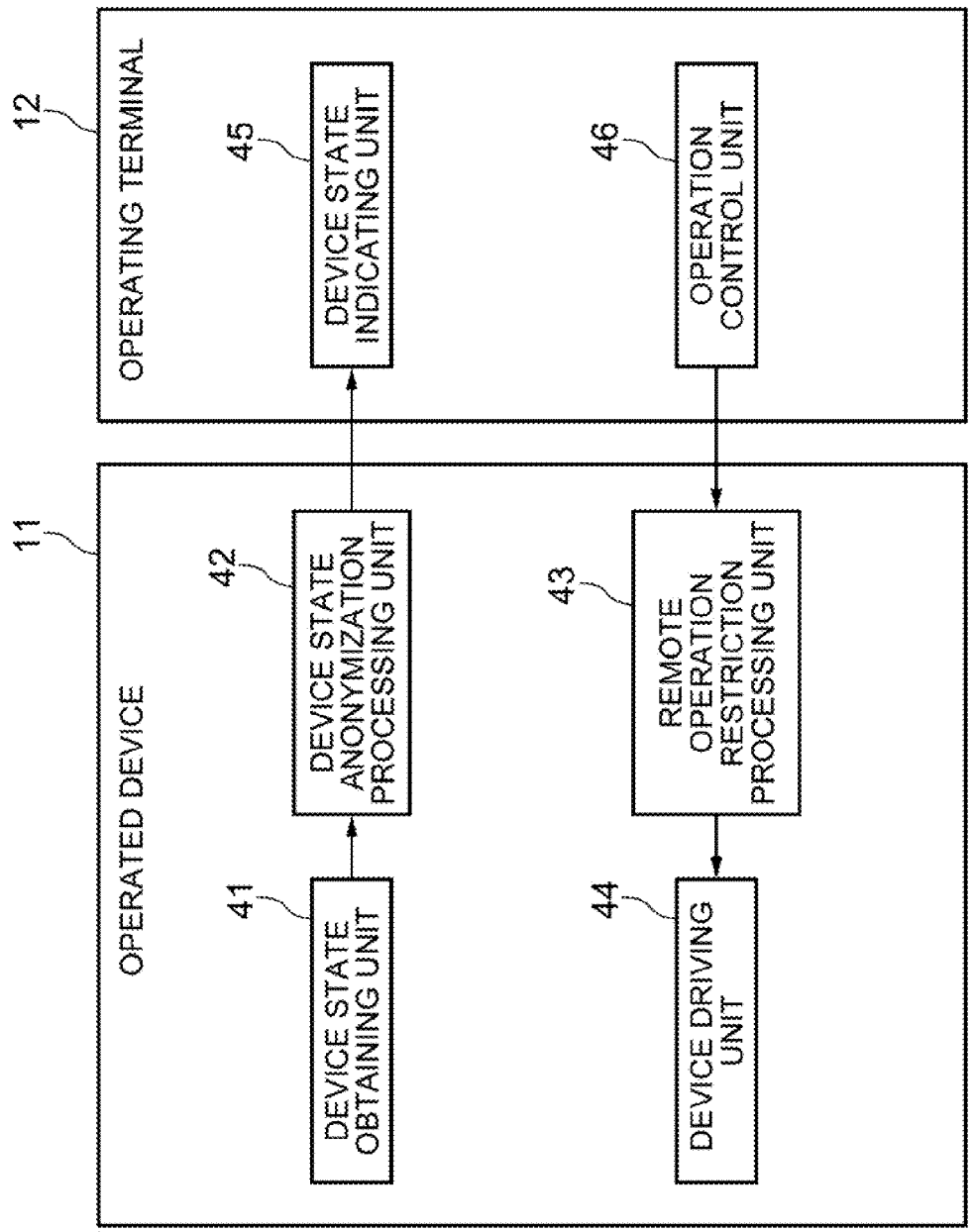

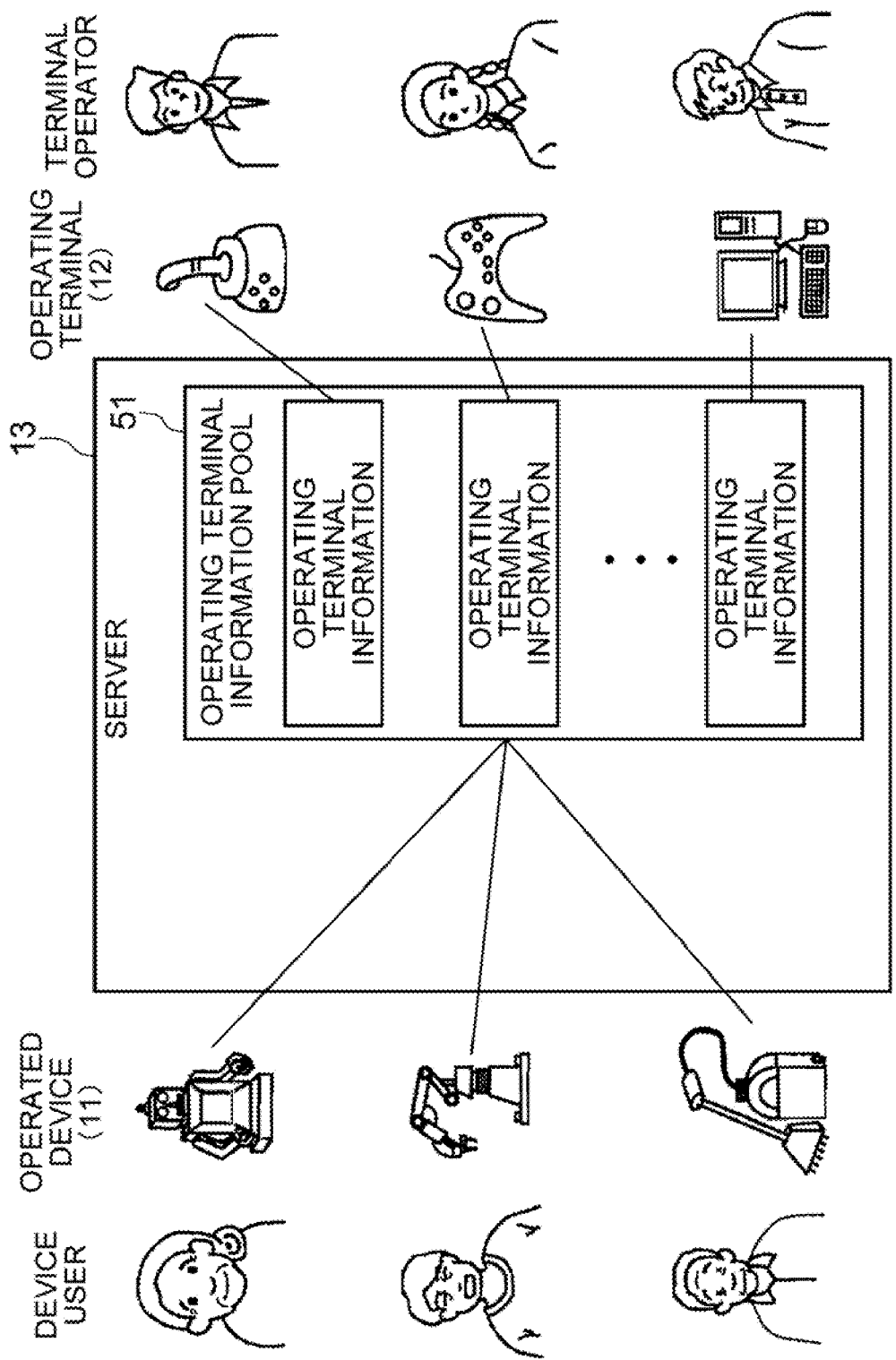

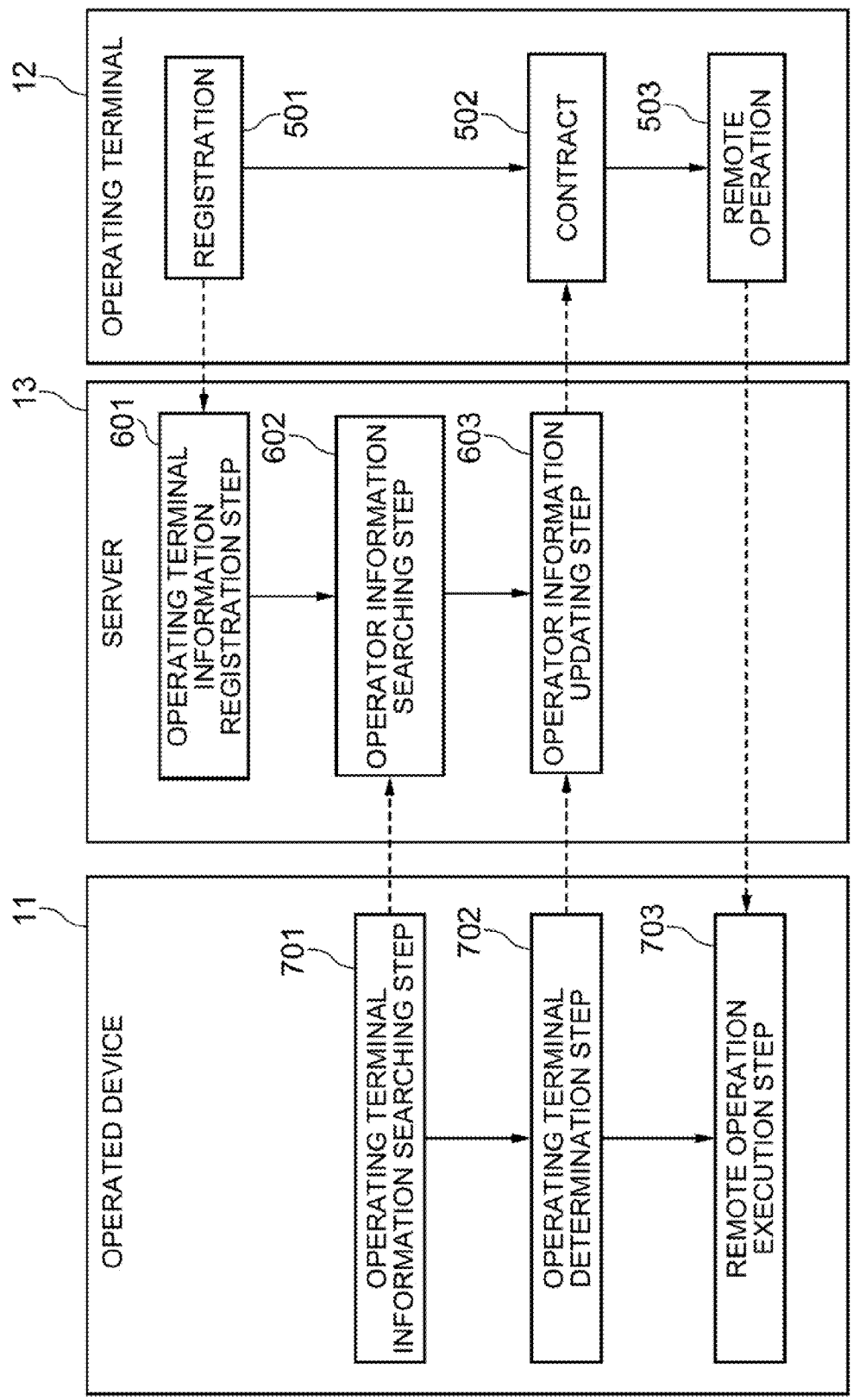

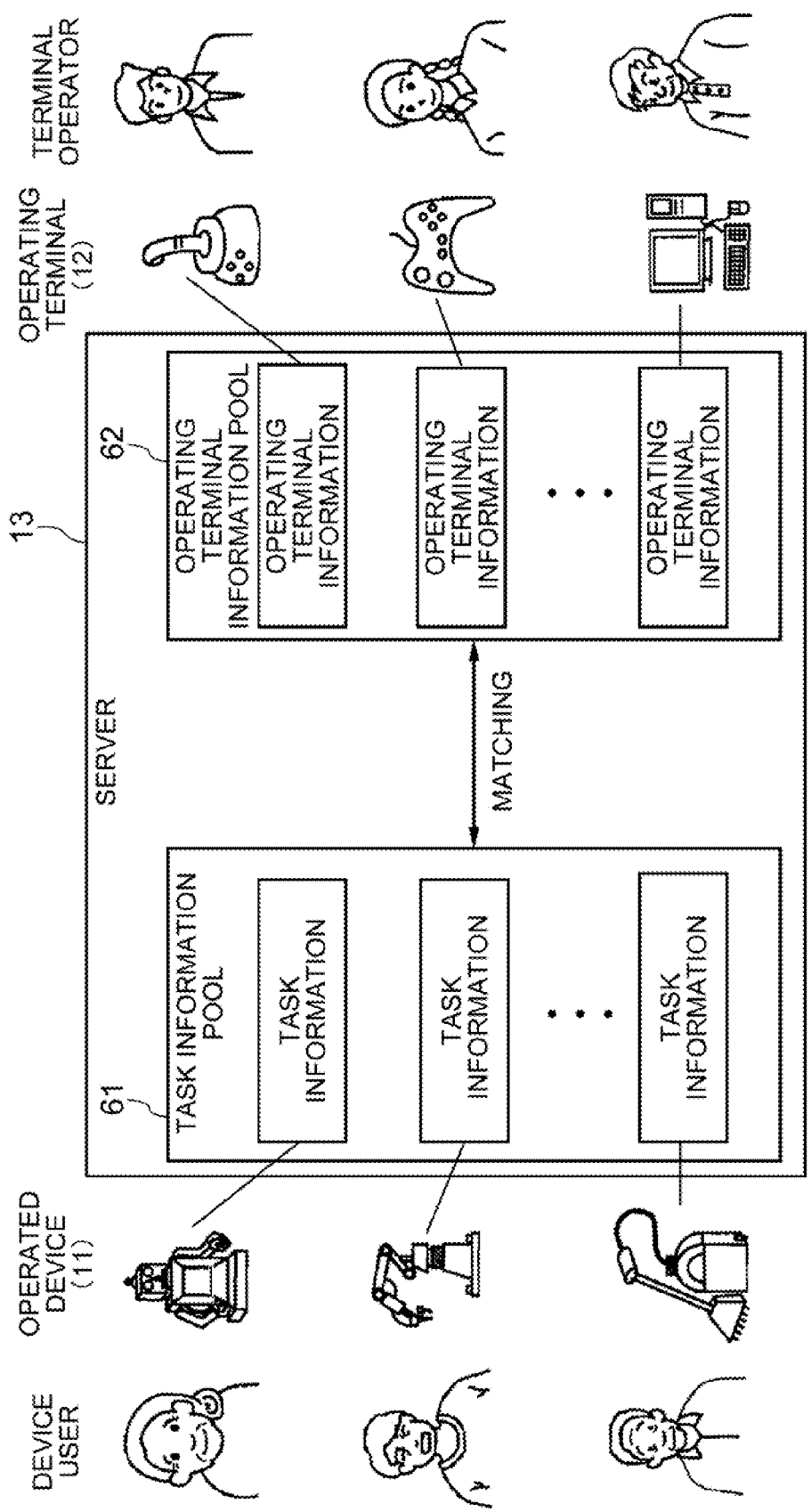

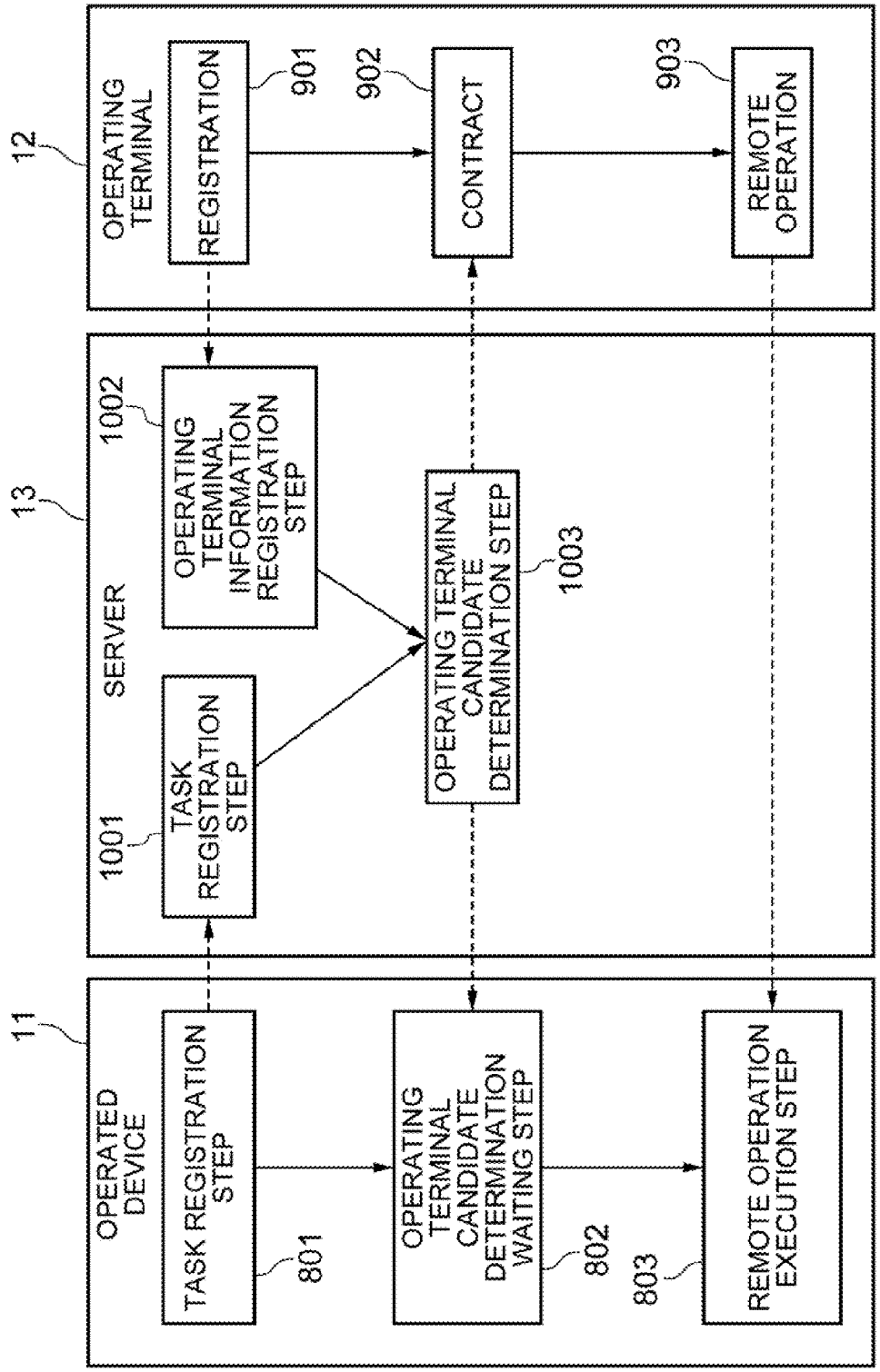

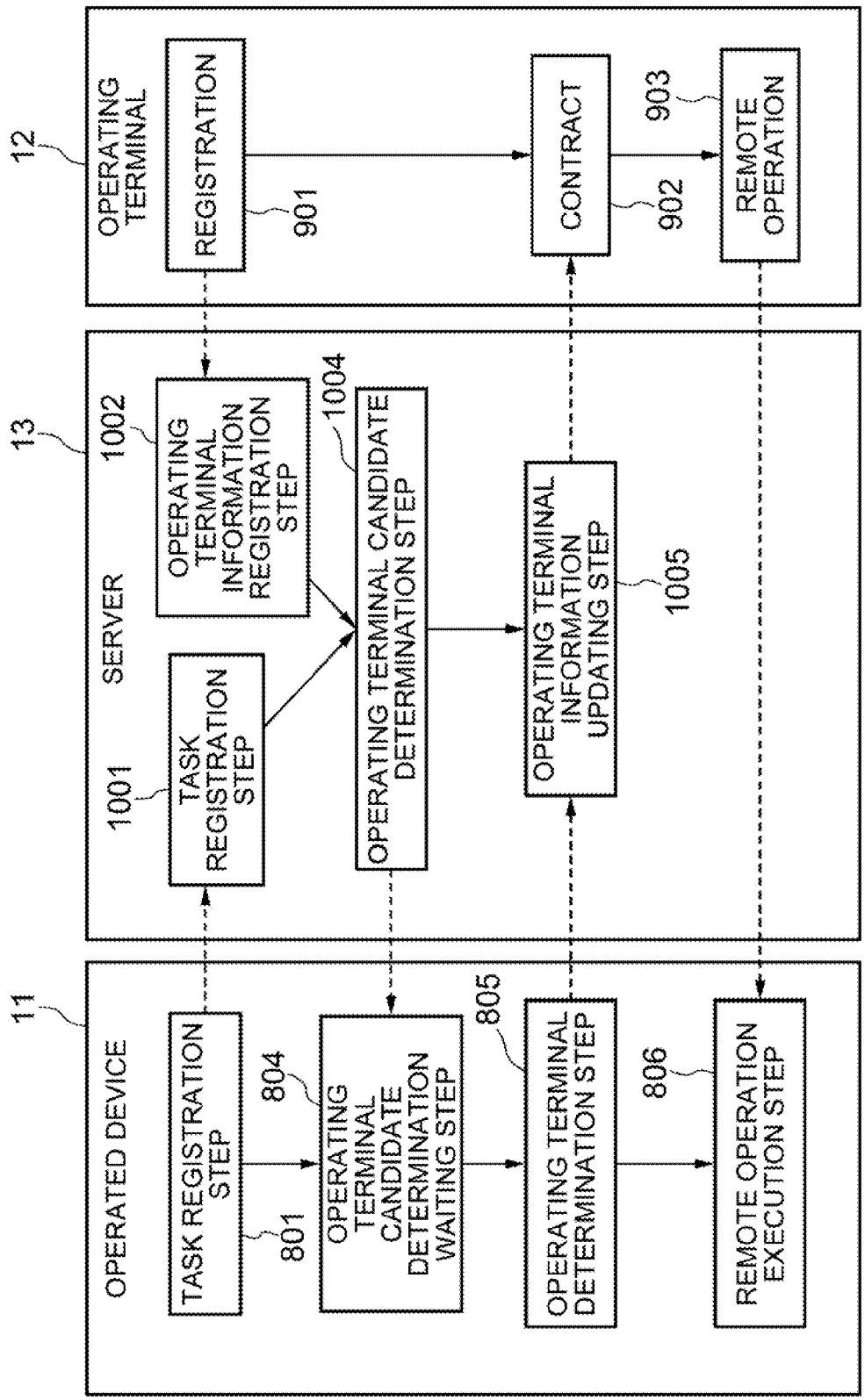

US 7,991,885 B2

REMOTE OPERATION SYSTEM, SERVER, REMOTELY OPERATED DEVICE, REMOTE OPERATION SERVICE PROVIDING METHOD

This application is the National Phase of PCT/JP2008/058533, filed May 8, 2008, which claims the priority right based on Japanese patent application no. 2007-124400 filed on May 9, 2007, and the disclosure thereof is hereby incorporated by reference in its entirety.

FIELD OF THE INVENTION

The present invention relates to a system for remotely operating an operated device from an operating terminal, and particularly, to a system for remotely operating the operated device via network.

BACKGROUND

In a field of robot researching, it has been considered to reduce burdens of human by having a robot perform annoying tasks such as housework and the like. Examples of such tasks are: feeding a pet; taking a pet for a walk; cleaning; dishwashing; heavy lifting; carrying out surgery; performing healing behavior; self-battery charging; and the like. However, it is not realistic at present to expect the robot to perform complicated tasks such as housework and the like autonomously, because it requires still further developments in recognition technology and control technology. Such inadequacy of the recognition technology and the control technology described above can be compensated by operations of human, and the robot becomes possible to perform relatively complicated tasks according to operations of human.

Until now, many researches about the remote operation of the robot have been performed, and many techniques are proposed (see Patent Documents 1-5). Patent Documents 1 discloses a system which remotely operates an operated robot as being a slave from an operating robot as being a master via internet. Patent Documents 2 discloses a system in which a robot feed pets and waters plants based on a bidirectional communication between an operating terminal and the robot. Patent Documents 3 discloses a system in which a robot is remotely operated from a remote operating unit based on operating information created by referring to user information accumulated in advance. Patent Documents 4 discloses a system in which a robot is controlled interactively based on a bidirectional communication. Patent Documents 5 discloses a system in which a medical specialist operates a master manipulator to have a slave manipulator work remotely, and diagnoses a patient by the slave manipulator.

Patent Document 1: Japanese Unexamined Patent Publication 2004-17186
Patent Document 2: Japanese Unexamined Patent Publication 2003-6532
Patent Document 3: Japanese Unexamined Patent Publication 2002-354551
Patent Document 4: Japanese Unexamined Patent Publication 2002-101333
Patent Document 5: Japanese Unexamined Patent Publication 2002-85353

However, when having the robot perform the housework by remote operation, the operation may become a burden equal to or more than that beard when a human performs the housework by oneself directly. In such a case, the object to reduce the burden of the human cannot be achieved.

On the other hand, it is also considerable that an agency undertakes the remote operation of the robot as business. With this, since the agency operates the robot in place of the user, the burden of the user can be reduced. However, when considering the profitability of the agency undertaking the remote operation, there is such a possibility that the cost paid by the user for the remote operation of the robot becomes high, or, the variation of the tasks that can be requested to the agency is limited. As the result, it is also possible that opportunity for using the remote operation service is limited.

When having the robot perform a commonly-used task that is relatively complicated such as housework and the like, the variation of the services and the cost therefor become crucial issues, and such issues have to be cleared in order to create a housekeeping robot.

For those reasons, the remote operation robot had not been beneficial for performing the tasks such as housework, which is frequently used and the effect of the robot for reducing the user's burden is great. Therefore, such system has been limited to have the robot perform simple tasks such as looking after the house by operating the robot remotely when user is being out, and it has not been a routinely-available, user-friendly system for the device user.

It is an exemplary object of the present invention to provide a remote operation system that is improved to be user-friendly for the device user.

SUMMARY OF THE INVENTION

In order to achieve the aforementioned object, a remote operation system according to the present invention is a remote operation system for having an operated device perform a task by operating the operated device remotely from an operating terminal via a communication network, and the system is configured such that:
  two or more operating terminals and two or more operated devices are arranged to be accessible to a server via the communication network;
  each of the operated devices includes a device which transmits information requesting to have its own task performed to the server;
  each of the operating terminals includes a device which transmits information requesting to perform the task of the operated device to the server; and
  the server includes a device which manages pieces of information transmitted from the two or more operating terminals and the two or more operated devices respectively, selects a combination of one operated device and one operating terminal suitable for each other based on the information, and relays the one operated device and the one operating terminal.

According to the present invention, the operated device and the operating terminal for remotely operating the operated device can be matched by the server on the communication network. Therefore, by determining a terminal operator from the public at large, the user-friendliness for the device user can be improved.

BRIEF DESCRIPTION OF THE DRAWINGS

FIG. 6 is a block diagram showing configurations of the operated device and an operating terminal;

FIG. 7 is a pattern diagram for explaining an action of the remote operation robot system according to a second exemplary embodiment;

FIG. 8 is a flowchart showing the action of the remote operation robot system according to the second exemplary embodiment;

FIG. 9 is a pattern diagram for explaining an action of the remote operation robot system according to a third exemplary embodiment;

FIG. 10 is a pattern diagram for explaining an action of the remote operation robot system according to the third exemplary embodiment; and FIG. 11 is a flowchart showing another action of the remote operation robot system according to the third exemplary embodiment.

REFERENCE NUMERALS

Figure 1:
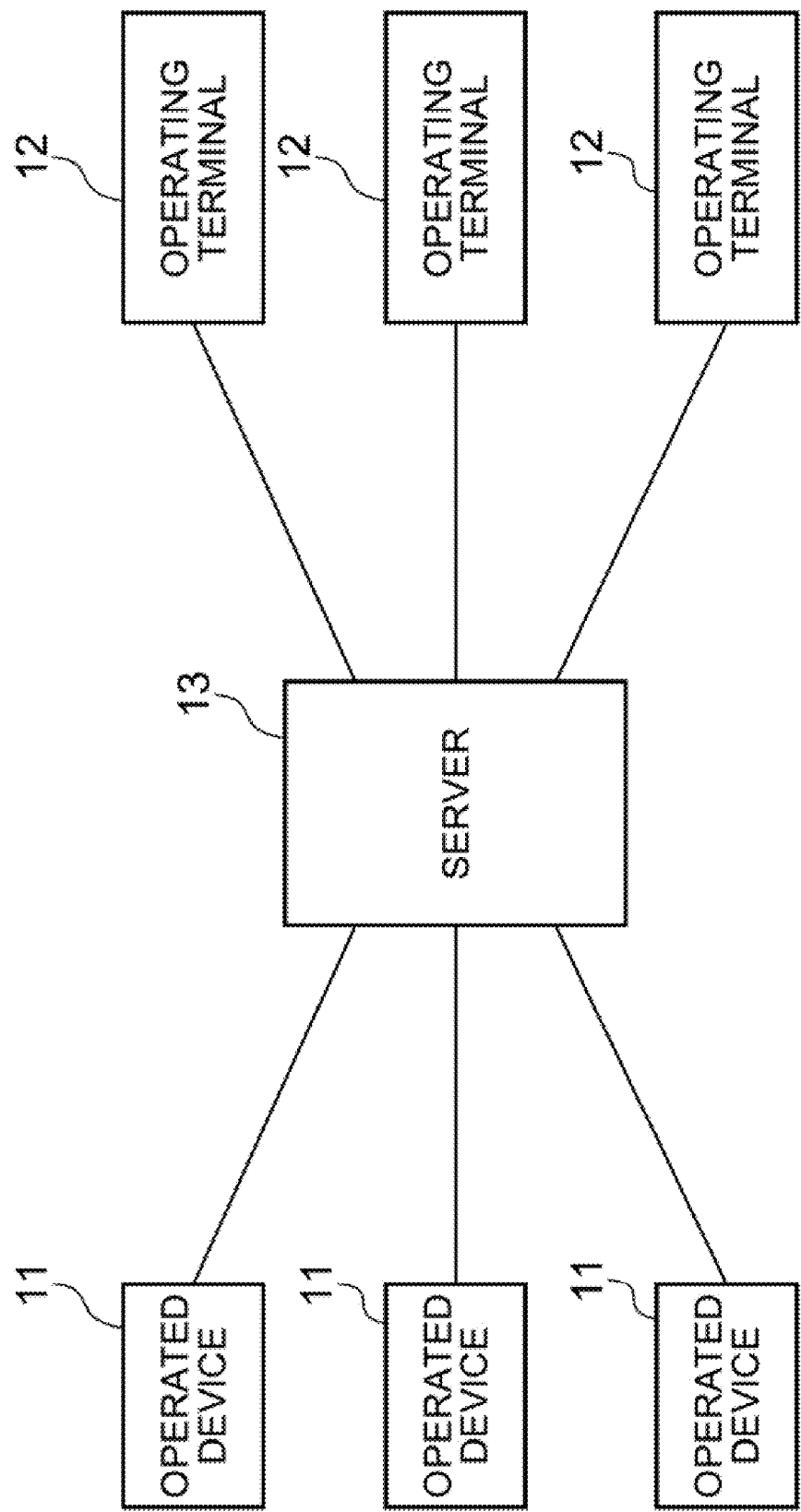
FIG. 1 is a block diagram showing a configuration of a remote operation robot system according to a first exemplary embodiment.

11 Operated device
12 Operating terminal
13 Server
21 Operated side information recording unit
22 Operating side information recording unit
23 Matching unit
31 Task information pool
41 Device state obtaining unit
42 Device state anonymization processing unit
43 Remote operation restriction processing unit
44 Device driving unit
45 Device state indicating unit
46 Operation control unit

DETAILED DESCRIPTION

Here, an exemplary embodiment for carrying out the present invention will be described in detail by referring to the drawings.

First Exemplary Embodiment

FIG. 1 is a block diagram showing a configuration of a remote operation robot system according to a first exemplary embodiment. Referring to FIG. 1, the remote operation robot system includes a plurality of operated devices 11, a plurality of operating terminals 12, and a server 13. The operated devices 11 are connected to the server 13 via communication network such as Internet (not shown). Similarly, the operating terminals 12 are connected to the server 13 via the communication network.

An operated device 11 is a device to be operated remotely via the communication network, and the device is a robot, for example. The operated device 11 performs a task by operated remotely from an operating terminal 12. The operating terminal 12 that operates the operated device 11 remotely is determined on the server 13. The tasks mean works performed by the robot in place of a human (device user), and the examples of such tasks are: feeding a pet; taking a pet for a walk; cleaning; dishwashing; heavy lifting; carrying out surgery; performing healing behavior; self-battery charging; and the like.

To perform the task, first, the operated device 11 notifies the server 13 of information of the task the operated device 11 has to perform (hereinafter referred to as "operation executed request information"). For example, it may be configured such that when a device user inputs a task desired to be performed by the operated device 11, the operated device 11 notifies the server 13 of the operation executed request information about the task. The operation executed request information includes information indicating the task the device user desires to be performed by the remote operation.

When the operating terminal 12 that operates the operated device 11 is determined on the server 13, the operated device 11 performs the task by being operated from the operating terminal 12. The combination of the operated device 11 and the operating terminal 12 that operates the operated device 11 determined on the server 13 is notified as matching information from the server 13; therefore, the operating terminal 12 only has to follow it.

The operating terminal 12 is a terminal that operates the operated device 11 remotely via the communication network. The operating terminal 12 operates the operated device 11 remotely to have the task performed. The operated device 11 to be operated by the operating terminal 12 is determined on the server 13.

To perform the task, at first, the operating terminal 12 notifies the server 13 of information of the task a terminal operator desires to operate from the operating terminal 12 (hereinafter referred to as "operation executing request information"). For example, it may be configured such that when the terminal operator inputs a task he/she desires to operate, the operating terminal 12 notifies the server 13 of the operation executing request information about the task. The operation executing request information includes information indicating the task the terminal operator desires to operate remotely.

When the operated device 11 to be operated from the operating terminal 12 is determined on the server 13, the operating terminal 12 operates the operated device 11 to have the task performed according to commands inputted from the terminal operator. The combination of the operated device 11 and the operating terminal 12 that operates the operated device 11 determined on the server 13 is notified as matching information from the server 13; therefore, the operating terminal 12 only has to follow it.

The server 13 receives the operation executing request information from the operating terminal 12 of the terminal operator who desires to operate the operated device 11 remotely; receives the operation executed request information from the operated device 11 of the device user who desires to have the operated device 11 operated remotely; determines the combination of the operating terminal 12 and the operated device 11 to be operated remotely from the operating terminal 12 based on the operation executing request information and the operation executed request information; and notifies both the operating terminal 12 and the operated device 11 of the determined result as the matching information.

Figure 2:
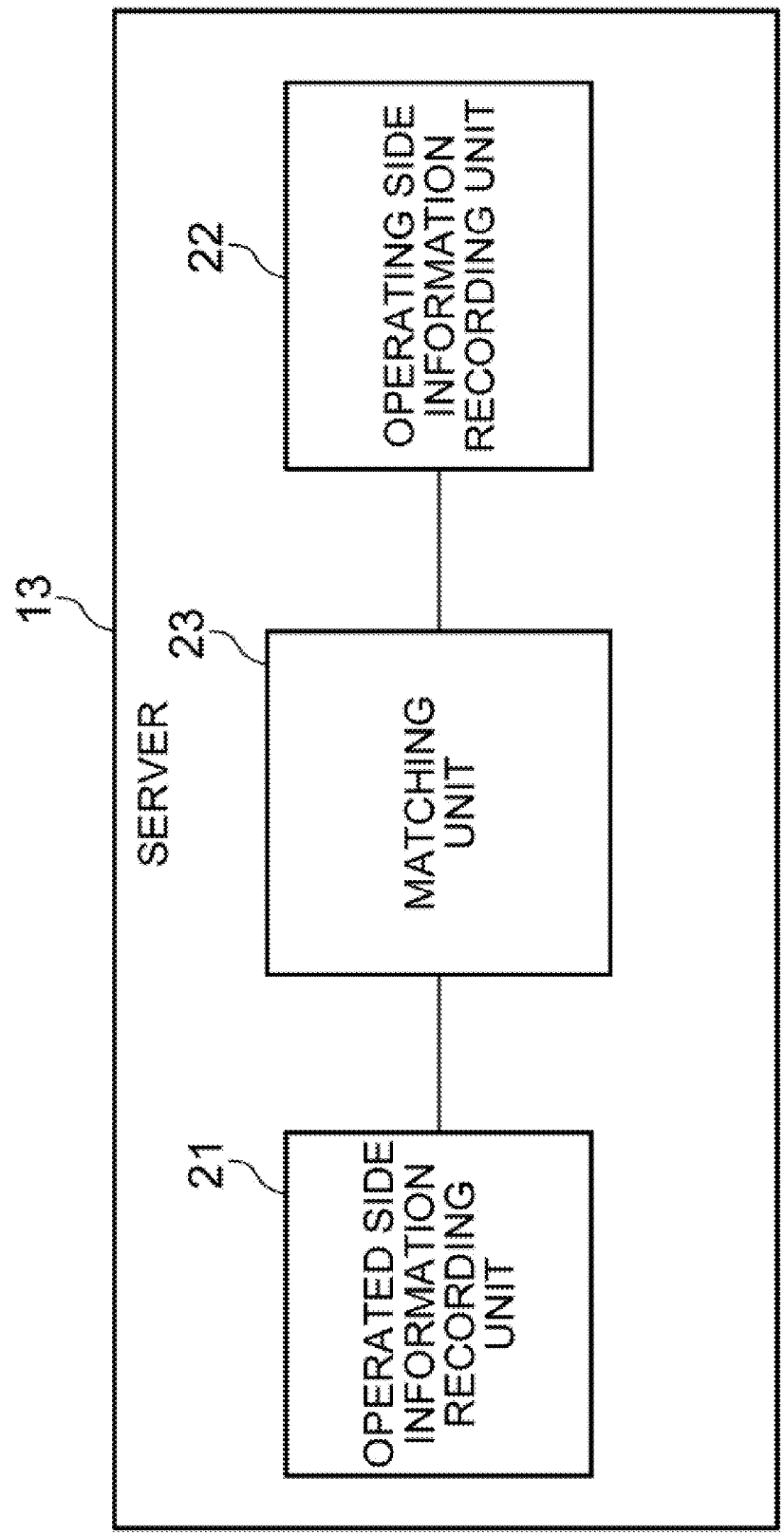
FIG. 2 is a block diagram showing a configuration of a server.

FIG. 2 is a block diagram showing a configuration of the server 13. Referring to FIG. 2, the server 13 includes an operated side information recording section 21, an operating side information recording section 22, and a matching section 23.

The operated side information recording section 21 receives and holds the operation executed request information sent from the operated device 11.

The operating side information recording section 22 receives and holds the operation executing request information sent from the operating terminal 12.

The matching section 23 determines the combination of the operating terminal 12 and the operated device 11 to be operated remotely from the operating terminal 12, based on the operation executing request information held by the operating side information recording section 22 and the operation executed request information held by the operated side information recording section 21. Then, the matching section 23 notifies both the operating terminal 12 and the operated device 11 of the determined result as the matching information.

Figure 3:
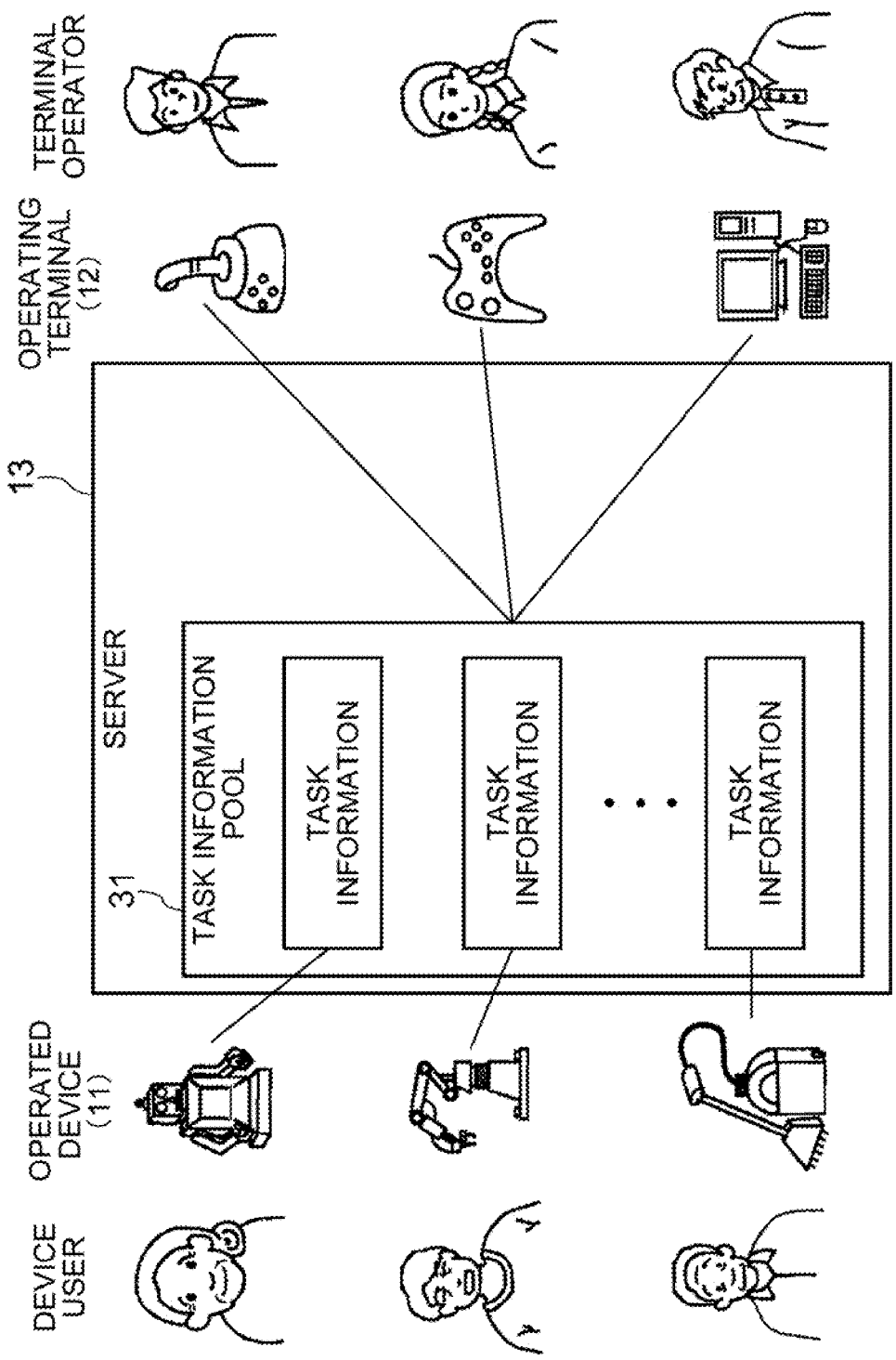
FIG. 3 is a pattern diagram for explaining an action of the remote operation robot system according to the first exemplary embodiment.

FIG. 3 is a pattern diagram for explaining an action of the remote operation robot system according to the first exemplary embodiment.

In this exemplary embodiment, the combination of the operated device 11 and the operating terminal 12 is determined in an auction style.

The information of the task the device user desires to be performed with the remote operation is transmitted from the operated device 11 to the server 13 as the operation executed request information. The information of the task indicated in the operation executed request information is registered in a task information pool 31 of the server 13 and disclosed on the server 13 as shown in FIG. 3. The terminal operator can browse the disclosed task information pool 31 by accessing to the server 13 from the operating terminal 12. Further, when there is a task the terminal operator desires to operate by himself/herself, he/she can bid by designating a certain task. When the terminal operator bids by designating the task, operation executing request information indicating the bid designating the task is notified from the operating terminal 12 to the server 13.

The server 13 records the operation executing request information bidding for each task registered in the task information pool 31 as the operation executed request information, and determines the combination of the operating terminal 12 and the operated device 11 by each task based on the operation executed request information and the operation executing request information.

Figure 4:
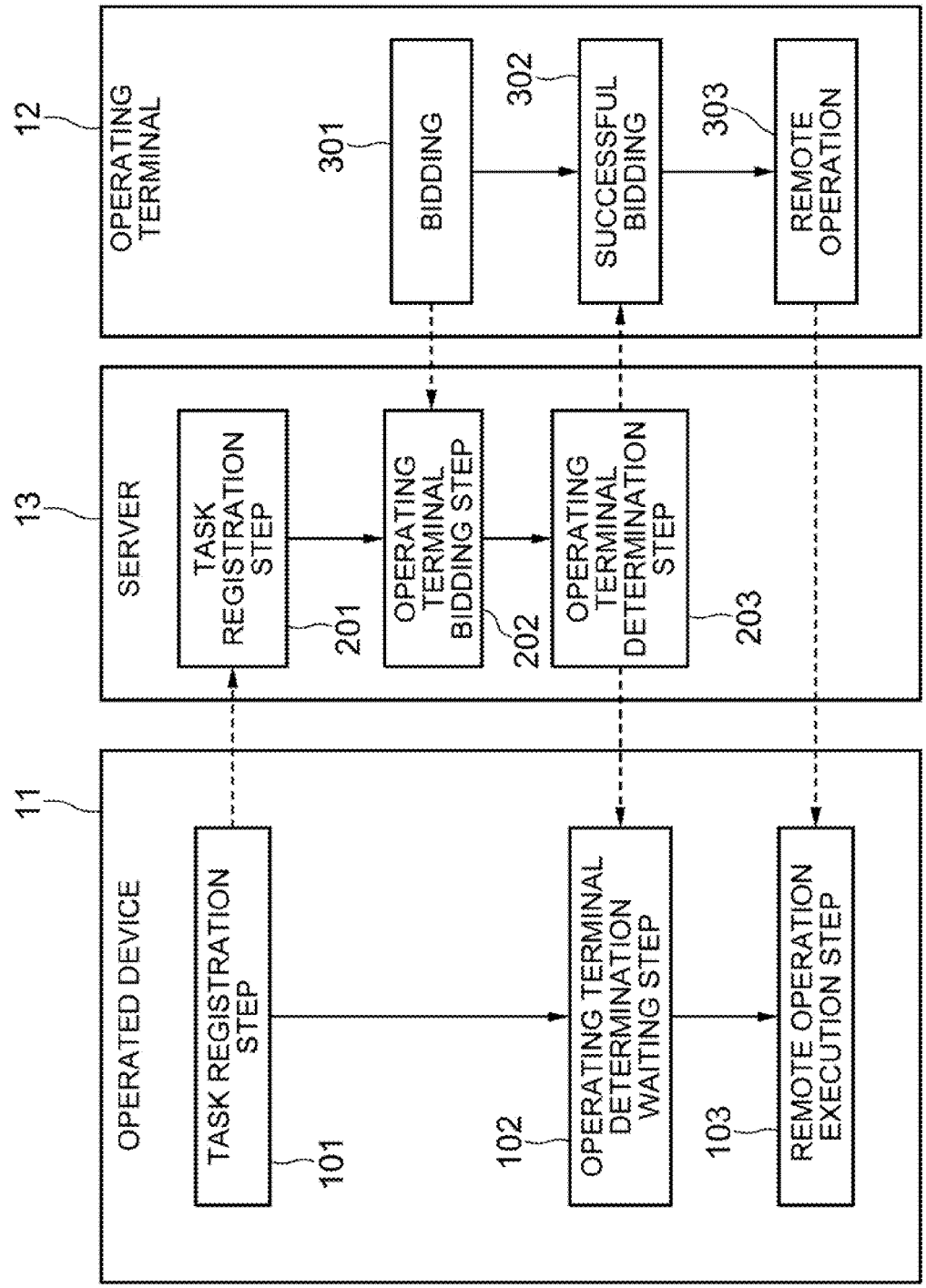
FIG. 4 is a flowchart showing the action of the remote operation robot system according to the first exemplary embodiment.

FIG. 4 is a flowchart showing an action of the remote operation robot system according to the first exemplary embodiment. The specific action of the remote operation robot system will be explained by referring to FIG. 4.

First, the operated device 11 notifies the server 13 of the operation executed request information indicating the task to be performed (task registration step 101). The server 13 registers the operation executed request information notified from the operated device 11 in the task information pool 31 and discloses it (step 201). The examples of such tasks are: self-battery charging; feeding a pet; taking a pet for a walk; cleaning; dishwashing; heavy lifting; carrying out surgery; performing healing behavior; and the like.

For example, self-battery charging task is started when battery charge of the operated device 11 is lowered to be less than a certain level, and it is the task such as moving to a battery charging station (not shown) and docking with the station.

Since the self-battery charging task is a relatively simple task, it may be performed by mixing an autonomous performance and the remotely operated performance, instead of relying on the remote operation completely. For example, it may be configured such that the task is performed autonomously by the operated device 11 itself basically, and when the autonomous performance according to algorithm becomes impossible due to an unexpected obstacle or the like, the remote operation is requested.

Figure 5:
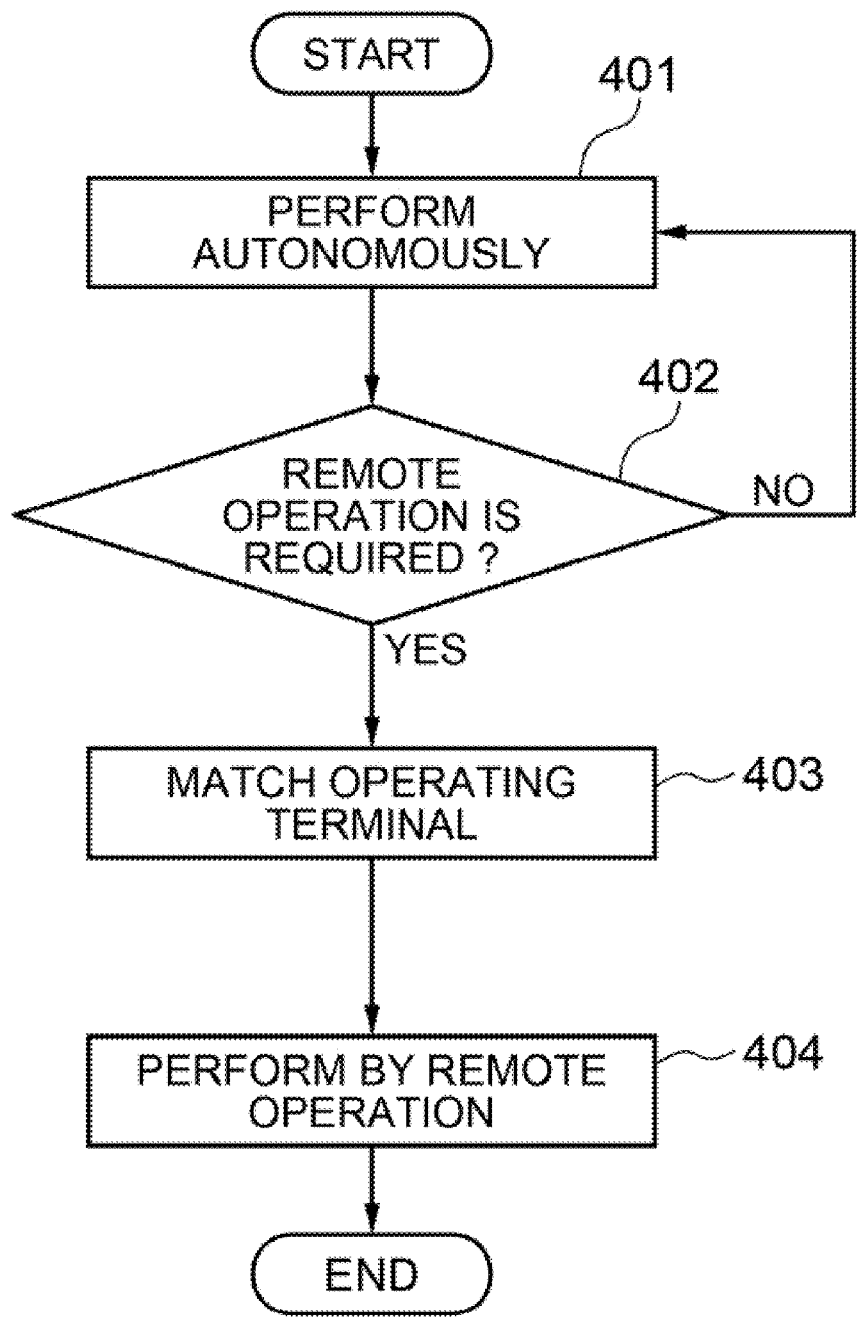
FIG. 5 is a flowchart showing an example of an action of an operated device when an autonomous performance and a remotely operated performance are combined.

FIG. 5 is a flowchart showing an example of the action of the operated device when the autonomous performance and the remotely operated performance are mixed. Referring to FIG. 5, the operated device 11 performs the task autonomously at first (step 401). Next, the operated device 11 judges whether it is necessary or not to perform the task according to the remote operation (step 402). When the remote operation is not necessary, the operated device 11 returns to step 401 and continues the autonomous performance.

When the remote operation is necessary, the operated device 11 performs operating terminal matching processing (step 403). In the operating terminal matching processing, the operated device 11 transmits the operation executed request information to the server 13 and requests the server 13 to determine the operating terminal 12 for operating to perform the task remotely. When receiving the matching information containing information about the operating terminal 12 that performs the task of the operated device 11 from the server 13, the operated device 11 performs the task by being operated from the operating terminal 12 (step 404).

Note that the operated device 11 may utilize, for its own judgment, a judging result for other operated device in which whether the other operated device on the communication network can perform a task autonomously or not is indicated. For example, when the other operated device 11 judged the autonomous performance of the self-battery charging task was not possible, the operated device 11 located at the same environment may judge the autonomous performance of the self-battery charging task as not being possible.

As another example, the dish washing task may be a task such as washing the dishes stacked in a kitchen by using a sponge or using water pressure, and may be a secondary task such as putting the dishes stacked in the kitchen into a dishwasher and starting it. In such a case, an operated device 11 having actuators such as arms or fingers is used.

As still another example, the healing behavior performing task may be considered as such a task that a pet robot behaves lovably, or a robot acts as a conversation partner for the device user. In such, there is a case in which advanced techniques such as voice recognition, text analyzing, and commonplace database are required, and it is realistic sometimes to cover those techniques by the remote operation of a human (terminal operator), considering an actual state of those techniques.

In such a case, an operated device 11 having a configuration which can express the behavior by resembling eyes, mouth, and limbs is used. For example, the device may have a configuration such as an LED module, a display, a mechanism for expressing behavior, and a motor for driving the mechanism.

Further, the task to be performed by the operated device 11 is, for example, inputted by the device user into the operated device 11. In such a case, the operated device 11 may notify the server 13 of the inputted information as the operation executed request information.

The information inputted into the operated device 11 by the device user includes respective items such as: assignment; anonymity level; restricting condition; and payment, as an example. The assignment is information about content of the task. The anonymity level is information about protecting privacies of the device user and owner of the operated device 11, and it indicates the level of anonymization of the information to be measured by the operated device 11. The restricting condition is the information about restricting the action of the operated device 11 operated remotely. For example, a moving range can be restricted. By this restriction, safety, convenience, privacy and the like of the device user can be protected. The payment is the information about compensation to be paid for the terminal operator who operates the operated device 11 remotely.

As for the dishwashing task, when the device user inputs "dishwashing" as the assignment, "edge imaging" as the anonymity level, "movement radius 1 km" as the restricting condition, and "100 yen" as the payment, the operation executed request information containing those pieces of information is notified to the server 13, and registered in the task information pool 31 of the server 13. "Edge imaging" of the anonymity level means that the image picked up by the operated device 11 is not transferred as it is to the operating terminal 12, but transferred as an image with edge only, through by being converted through image processing.

The operation executed request information registered in the task information pool 31 is disclosed on the server 13. At this time, the server 13 may disclose information of evaluation for previous utilization in addition to the information inputted by the device user. The additional information includes, for example, the device user's evaluation and evaluator's comment. In the example of the dishwashing task, information of the number of positive evaluations with respect to the number of previous utilizations, such as "84/92," as the device user's evaluation, may be added. Also, comments of previous terminal operators, such as "The room was clean and it was easy to move" or "received a fairly compensation," may be added as the evaluator's comment. Also, not only the dishwashing task but also other types of tasks may be included as evaluation axes. For example, information of evaluation in which all the tasks requested by the device user previously are set as the evaluation axes may be disclosed by being added to the operation executed request information. Further, the number of evaluations received previously may be used as criteria instead of the number of previous requests for remote operation of the tasks.

Also, the device user may be able to input a planarity of times of performances of a task collectively instead of inputting one by one. For example, the operation executed request information for requesting a continuous performance of a task such as the dishwashing for one month may be able to be registered in the server 13. Further, a trial period may be added when the operation executed request information is registered, other than a full-scale performance.

Next, return to FIG. 4, the terminal operator browses the task information pool 31 disclosed on the server 13 from the operating terminal 12, selects a task he/she desires to operate, and bids on the task. Then, the operating terminal 12 notifies the server 13 of the operation executing request information (step 201).

The server 13 stores the pieces of operation executing request information notified from the operating terminals 12 because of the bidding of the terminal operators collectively by each of the tasks registered in the task information pool 31 (operating terminal bidding step 202).

Then, the server 13 determines one operating terminal 12 for performing the task by operating an operated device 11 remotely, from among the operating terminals 12 bidding on the task (step 203), and notifies the operated device 11 and the operating terminal 12 of the matching information as the determined result.

For example, if bidding time for bidding a task registered in the task information pool 31 is set, the server 13 may determine the operating terminal 12 for performing the task after the lapse of the bidding time.

As a method to determine the operating terminal 12 (terminal operator) for performing the task of the operated device 11, there is a method to determine based on bidding prices as in the case of general auctions. In this case, the process may be proceeded such that the terminal operator inputs the amount of compensation desired to be paid for the performance of the task from the operating terminal 12, and the amount is notifies from the operating terminal 12 to the server 13 by being included in the operation executed request information. The server 13 may determine a terminal operator who proposes the lowest amount as a successful bidder, for example.

Also, as another determining method, a terminal operator who bids first may be determined as a successful bidder. Further, the terminal operator with the highest skill, the most experienced terminal operator, the most evaluated terminal operator, the most reliable terminal operator, or the terminal operator contracted in advance, may be determined as a successful bidder. In such a case, the server 13 may accumulate information of the evaluation by the device users about each of the terminal operators who had performed the remote operation previously, and determine a successful bidder based on the information. Furthermore, various determining methods described above may be combined for use.

Also, the server 13 may notify the operated device 11 of the information about the operating terminal 12 and the terminal operator to whom the task is to be assigned, as well as the information about the contracting condition, and request affirmation from the device user before determining the operating terminal 12 that operates the operated device 11. Considering the possibility of exchange of money, it is preferable to request the affirmation from the device user before final determination. However, considering the convenience of the device user, the operated device 11 may be given decision-making authority within a certain definite range. In this case, when the information about the operating terminal 12, the terminal operator, and the contracting condition are notified from the server 13 before the determination, the operated device 11 responds to the notification and allows the server 13 to determine the operating terminal 12 without requesting the affirmation from the device user as long as the contracting condition and the like are within a certain definite range.

Affirmation processing between the operated device 11 and the device user may be performed by using a combination of a screen display and a button operation; also, it may be performed by UI (User Interface) dialogue on a touch panel, or, performed by voice dialogue by combining of voice reproduction or voice synthesis with voice recognition.

Return to FIG. 4, if the operated device 11 receives the matching information from the server 13 at a time when being in a state of waiting for a determination of the operating terminal 12 by which the task is to be performed (operating terminal determination waiting step 102), the operated device 11 presents the matching information to the device user. Also, the operating terminal 12 receives the matching information from the server 13 when the operating terminal 12 itself is determined as a successful bidder by the determination of the server 13 (step 302).

When the combination of the operated device 11 and the operating terminal 12 that operates the operated device 11 remotely is determined, the terminal operator performs the task by operating the operated device 11 from the operating terminal 12 (step 303, 103).

The compensation generated by the remote operation described above may be paid by electronic payment. In such s case, the compensation may be paid by the electronic payment when the server 13 determines the combination of the operated device 11 and the operating terminal 12, or, when the performance of the task is completed. Further, the compensation may be paid in such a manner that the compensation for a plurality of tasks generated in a certain period are paid at once collectively, or paid when the accumulated amount of the compensation reaches at a certain amount, instead of paying the compensation at every performance of the task.

Though not shown in FIG. 4, finally, the device user may evaluate the remote operation executed by the operating terminal 12 or the terminal operator, and input the evaluation result to the operated device 11. The evaluation result is notified from the operated device 11 to the server 13. For example, the device user evaluates whether the task is performed without any trouble, or, evaluates the degree of the performance of the task quantitatively by using five-grade evaluation or the like.

Also, the compensation to be paid for the terminal operator may be changed according to the evaluation result. For example, it may be arranged such that the compensation is paid in full when the task is performed successfully, while the compensation is not paid or a part of the compensation is paid when the task is not performed successfully.

Further, accuracy, amount of time required, price setting, attitude, and the like may be evaluated independently as evaluation items. With this, precise information about the operator, such as skill, experience, reliability and the like can be obtained.

Furthermore, the device user may input a comment evaluating the terminal operator from the operated device 11. This comment is notified from the operated device 11 to the server 13. The comment is qualitative evaluation, such as "It was dealt with quickly" or "A wine glass was broken when washing dishes."

On the contrary, the terminal operator may input a comment evaluating the device user or the operated device 11 into the operating device 12. It is an evaluation about operability of the operated device 11 according to surrounding environment, price setting for the compensation, requesting attitude, and the like. For example, the terminal operator may evaluate whether it was easy to perform the task, the price setting for the compensation was fair, and the like.

Also, the terminal operator may input a comment evaluating the device user from the operating device 12. This comment is notified from the operating device 12 to the server 13. The comment is such as "The room was clean and it was easy to move" or "received a fairly compensation." The server 13 can utilize the evaluation result and the evaluating comment as information to be added to the operation executed request information received from the operated device 11 thereafter. With this, precise information about previous utilization of the device user is disclosed and then a fairly system management becomes possible.

FIG. 6 is a block diagram showing a configuration of the operated device 11 and the operating terminal 12. Referring to FIG. 6, the operated device 11 includes a device state obtaining unit 41, a device state anonymization processing unit 42, a remote operation restriction processing unit 43, and a device driving unit 44.

The device state obtaining unit 41 includes an input device (not shown) for measuring a device state, and obtains the device state measured by the input device. The input device is, for example, a camera, a microphone, an acceleration sensor, an ultrasonic sensor, an infrared sensor, an RFID tag sensor, or the like.

The device state anonymization processing unit 42 performs anonymization processing on the device state information obtained by the device state obtaining unit 41 according to an anonymization level inputted by the device user and transmits it to the operating terminal 12. The anonymization processing is performed for protecting the privacy of the device user, and it is processing for deleting information not required for the remote operation from the device state information, by processing image and sound, for example, while saving the information to be required. For the anonymization level, the information inputted as the operated device requesting information can be used. With this anonymization processing, the information related to the privacy of the device user can be prevented from being exposed excessively to the terminal operator via the operating terminal 12. The edging, as an example of the anonymization processing, is processing in which an image picked up by a camera of the device state obtaining unit 41 is converted to an edge-only image.

The remote operation restriction processing unit 43 receives operational instruction information from the operating terminal 12 and imposes restricts on the operational instruction information according to restriction condition inputted by the device user. The restriction is imposed for protecting safety, convenience, and privacy of the device user, and imposed for restricting the action of the operated device 11 to be operated remotely. For example, moving range or moving amount of the operated device 11 is restricted; volume of the sound expressed by the operated device 11 is restricted; brightness of the light emitted from the operated device 11 is restricted; or the like. Also, the action may be restricted such that the power consumption of the operated device 11 is kept at equal to or less than a certain level.

The device driving unit 44 includes a task performing device (not shown) for performing the task, and drives a driving device (task performing device) according to the operational instruction information restricted by the remote operation restriction processing unit 43. The task performing device is, for example, an actuator and a motor for driving it, a speaker, a monitor screen, an emission device, and the like.

On the other hand, the operating terminal 12 includes a device state indicating unit 45 and an operation control unit 46.

The device state indicating unit 45 includes an output device (not shown) and presents the device state information received from the operated device 11 to the terminal operator by outputting the information to the output device. For example, the device state 45 displays an image sent from the operated device 11 on the monitor screen. Also, the device state indicating unit 45 outputs sound sent from the operated device 11 from the speaker.

The operation control unit 46 includes an input device (not shown) for operating the operated device 11, and transmits the operational instruction information inputted to the input device by the terminal operator to the operated device 11. The input device is, for example, a controller such as a game pad, a joystick, etc., a mouse, a keyboard, a touch panel, an accelerator sensor, an RFID tag, a microphone, a camera, or the like.

The terminal operator inputs operational instructions from the input device equipped to the operation control unit 46 based on the device state information of the operated device 11 outputted to the output device equipped to the device state indicating unit 45 of the operating terminal 12.

At this time, in the operated device 11, since the device state obtained by the device state obtaining unit 41 is anonymization processed by the device state anonymization processing unit 42, the information about the privacy of the device user can be prevented from being exposed excessively to the terminal operator. As examples of the anonymization processing by means of image processing, edging, abstraction, color processing, abstraction of a particular part, and the like are considered. The abstraction means, for example, pixel reduction, tessellating, and the like. The particular part means, for example, face, long distance, particular range, and the like.

Also, at this time, safety, convenience, and privacy of the device user can be protected since the operational instruction information from the operating terminal 12 is restricted by the remote operation restriction processing unit 43.

Examples of the processing with which the movement is restricted according to the operational instruction are; not allowing the movement; allowing for changing the camera direction only; allowing a rotation on the spot only; allowing the movement within one-kilometer radius; and the like.

As described above, according to the exemplary embodiment, the operated device and the operating terminal that operates the operated device remotely are matched by the server on the communication network, and the task is performed by operating the operated device remotely from the operating terminal according to the matching. Therefore, by determining the terminal operator from the public at large, the user-friendliness for the device user can be improved.

For example, since it becomes possible to select the terminal operator from the public at large, the principle of competition is introduced, and the reduction in the compensation to be paid by the device user can be expected. Particularly, in a social environment with increasing population relating SOHO, net game, and virtual life as a background, if students, persons who don't have steady jobs, people in developing countries and the like, who can accept the request even at lower compensation, are going to participate in as terminal operators, the effect can be prominent.

Also, since it becomes possible to select the terminal operator from the public at large, the types of the tasks possible to be performed with remote operation are expected to increase. Generally, diversity arises spontaneously in a user-participation-type system such as a blog, a social networking system, and the like. The system according to the exemplary embodiment is also configured to be the user-participation-type system; therefore, the diversity of tasks is expected to arise spontaneously.

Further, since it becomes possible to select the terminal operator from the public at large, greater opportunity to use the service is expected to be given for the device user. When companies perform the remote operation, opportunity for the device user to use the service is restricted because of personnel shortages in the terminal operators of the company or the restriction of the time zone the service can be available for the convenience of the company. However, according to the exemplary embodiment, since it becomes possible to select the terminal operator from the public at large, the absolute number of terminal operators is maintained according to the principle of supply and demand, and there is such a possibility that greater opportunity is provided for the device user to utilize the service.

Second Exemplary Embodiment

In the first exemplary embodiment, the server receives and discloses the tasks the device users desire to be performed from the operated device first, accepts bidding from the terminal operators who desire to perform the disclosed tasks, and determines the combination of the operated device and the operating terminal.

On the other hand, in a second exemplary embodiment, first, a server registers operating terminal information about a terminal operator, such as experience in terms of task performances, previous evaluations received, and the like. The operating terminal information is used by a device user when making a decision on the terminal operator to whom the task is requested. Next, the server receives, from an operated device, operated condition information indicating desired conditions under which the task of the device user is performed. Then, the server searches the registered operating terminal information, extracts an operating terminal which satisfies the desired condition, and notifies the device user of it. Then, a server determines a combination of the operated device and the operating terminal after selection or affirmation is made by the device user.

A configuration of a remote operation robot system according to the second exemplary embodiment is similar to that of the first exemplary embodiment shown in FIG. 1. Also, a configuration of the server according to the second exemplary embodiment is similar to that of the first exemplary embodiment shown in FIG. 2.

However, in a server 13 according to the second exemplary embodiment, an operating side information recording unit 22 holds the information about the terminal operator of an operating terminal 12 as the operating terminal information, and an operated side information recording unit 21 receives and holds the operated condition information from an operated device 11. A matching unit 23 determines a combination of the operating terminal 12 and the operated device 11 to be operated remotely from the operating terminal 12 based on the operating terminal information held by the operating side information recording unit 22 and the operated condition information held by the operated side information recording unit 21. At this time, the matching unit 23 extracts the operating terminal 12 that satisfies the desired conditions included in the operated condition information, and determines the combination of the operating terminal 12 and the operated device 11 after selection or affirmation is made by the device user.

FIG. 7 is a pattern diagram for explaining an action of the remote operation robot system according to the second exemplary embodiment. FIG. 8 is a flowchart showing an action of the remote operation robot system according to the second exemplary embodiment.

Referring to FIG. 8, by receiving a notification from each of the operating terminals 12 (step 501), the server 13 registers the operating terminal information about the terminal operators of the operating terminals 12 in an operating terminal information pool 51 (operating terminal information registration step 601).

Then, the operated device 11 notifies the server 13 of the operated condition information according to the desire of the device user, and requests the server 13 to search the operating terminal 12 which can perform the operated device's task (operating terminal information searching step 701). The server 13 picks up the operating terminal 12 that satisfies the desired conditions included in the operated condition information notified by the operated device 11 from the operating terminal information pool 51, to notify the operated device 11 (operator information searching step 602).

When the device user selects or affirms the operating terminal from the operated device 11, the operating terminal determined through selection or affirmation is notified from the operated device 11 to the server 13 (operating terminal determination step 702). When receiving the notification from the operated terminal 11, the server 13 determines the combination of the operating terminal 12 and the operated device 11, updates the operating terminal information, and notifies the operating terminal 12 of the operated device 11 to be operated remotely (operator information updating step 603). The operating terminal 12 recognizes the contract to perform the task upon receiving the notification (step 502).

When the combination of the operating terminal 12 and the operated device 11 that operates the operating terminal 12 remotely is determined, the terminal operator operates the operated device 11 remotely from the operating terminal 12 to perform the task (step 503, 703). Also, after the operating terminal 12 operates the operated device 11 remotely and performs the task, the server 13 receives information about evaluation of the terminal operator by the device user from the operated device 11 and updates the information about the evaluation in the operating terminal information pool 51.

A configuration of the exemplary embodiment to operate the operated device 11 remotely from the operating terminal 12 for performing the task is similar to that of the first exemplary embodiment shown in FIG. 6.

The operating terminal information includes, for example, information about experienced task and evaluator's comment. The information about the experienced task may contain: the types of tasks performed previously; and the number of performances and the number of high evaluations received for each of the tasks. For example, assuming that a certain piece of operating terminal information contains such information as "self-battery charging (evaluation: 120/123)," "feeding a pet (evaluation: 12/15)," "dishwashing (evaluation: 28/40)," and the like, as the types of tasks and the number of high evaluations received with respect to the number of performances for each of the tasks. In those cases, what is shown is that the terminal operator performed "self-battery charging" task 123 times previously and received high evaluations 120 times. Also shown is that the terminal operator performed "feeding a pet" task 15 times and received high evaluations 12 times; further, the terminal operator performed "dishwashing" task 40 times and received high evaluations 28 times.

Also, the operating terminal information may contain comments from the device user who requested the task. For example, assuming that the operating terminal information contains comments such as "It was dealt with quickly" and "A wine glass was broken when washing dishes" as comments of the evaluator (client) about the terminal operator from the device user. The device user can select the operating terminal 12 and the terminal operator based on those comments.

Third Exemplary Embodiment

In a third exemplary embodiment, a server receives a task a device user desired to be performed as operation executed request information from an operated device and holds it in a task information pool. Also, the server holds an operating terminal information about a terminal operator, including such as experience of performing the task and previous evaluations received, in an operating terminal information pool. Then the server determines a combination of the operated device and an operating terminal after selection or affirmation is made by the device user based on the task information pool and the operating terminal information pool.

A configuration of the remote operation robot system according to the third exemplary embodiment is similar to that of the first exemplary embodiment shown in FIG. 1. Also, a configuration of the server according to the third exemplary embodiment is similar to that of the first exemplary embodiment shown in FIG. 2.

However, in a server 13 according to the third exemplary embodiment, an operated side information recording unit 21 receives and holds the operation executed request information from an operated device 11, and an operating side information recording unit 22 holds the information about the terminal operator of an operating terminal 12 as the operating terminal information. A matching unit 23 determines a combination of the operating terminal 12 and the operated device 11 to be operated remotely from the operating terminal 12 based on the operating terminal information held by the operating side information recording unit 22 and the operation executed request information held by the operated side information recording unit 21.

FIG. 9 is a pattern diagram for explaining an action of the remote operation robot system according to the third exemplary embodiment. FIG. 10 is a flowchart showing an action of the remote operation robot system according to the third exemplary embodiment.

Referring to FIG. 10, the operated device 11 firstly notifies the server 13 of the operation executed request information indicating the task to be performed (task registration step 801). The server 13 registers the operation executed request information notified from the operated device 11 in the task information pool 61 and discloses it as shown in FIG. 9 (step 1001). Also, by receiving a notification from each of the operating terminals 12, for example (step 901), the server 13 registers the operating terminal information about the terminal operators of the operating terminals 12 in an operating terminal information pool 62 as shown in FIG. 9 (operating terminal information registration step 1002).

Sequentially, the server 13 determines the combination of the operating terminal 12 and the operated device 11 to be operated remotely from the operating terminal 12 so that both of the operation executed request information and the operating terminal information satisfy the condition each other, by referring to a task information pool 61 and an operating terminal information pool 62 (operating terminal candidate determining step 1003). When the combination of the operating terminal 12 and the operated device 11 is determined, the server 13 notifies the operated device 11 and the operating terminal 12 of matching information indicating the combination.

If the operated device 11 receives the matching information from the server 13 at a time when being in a state of waiting for a determination of an operating terminal 12 by which the task is to be performed (operating terminal determination waiting step 802), the operated device 11 presents the matching information to the device user. Also, the operating terminal 12 recognizes the contract to perform the task when receiving the matching information from the server 13 (step 902).

When the combination of the operating terminal 12 and the operated device 11 that operates the operating terminal 12 remotely is determined, the terminal operator operates the operated device 11 remotely from the operating terminal 12 to perform the task (step 903, 803). Also, after the operating terminal 12 operated the operated device 11 remotely and performed the task, the server 13 receives information about evaluation of the terminal operator by the device user from the operated device 11 and updates the information about evaluation in the operating terminal information pool 62.

A configuration of the exemplary embodiment to operate the operated device 11 remotely from the operating terminal 12 for performing the task is similar to that of the first exemplary embodiment shown in FIG. 6.

The matching according to the exemplary embodiment may be performed by the server 13 based on offered amount of compensation contained in the operating terminal information about the terminal operator. Also, the matching may be performed based on: registration time of the operating terminal information in the operating terminal information pool 62; or the terminal operator's skill, experience, or evaluation received. Further, the matching may be performed so as to assign the terminal operator to a task of the operated device 11 with which the terminal operator has contracted in advance.

Also, the matching may be performed based on offered amount of compensation contained in the operation executed request information about the device user. Further, the matching may be performed based on: registration time of the operation executed request information in the task information pool 61; difficulty level of task; or previous performance achievement, evaluation, or reliability. Furthermore, the matching may be performed so as to assign the operating terminal 12 to a task of the operated device 11 with which the operating terminal 12 has contracted in advance.

Also, the matching may be performed by combining a part of or all of the items described above.

FIG. 11 is a flowchart showing another action of the remote operation robot system according to the third exemplary embodiment. FIG. 11 shows an example of the remote operation robot system according to the third exemplary embodiment, in which the server 13 determines the combination of the operating terminal 12 and the operated device 11 after selection or affirmation is made by the device user.

Referring to FIG. 11, after steps 1001 and 1002, the server 13 determines a candidate for the combination of the operating terminal 12 and the operated device 11 to be operated remotely from the operating terminal 12 so that both of the operation executed request information and the operating terminal information satisfy the condition each other, and notifies the operated device 11 of the candidate as matching candidate information (operating terminal candidate determining step 1004). The matching candidate information may contain a plurality of candidates for the operating terminal 12 that operates the operated device 11 remotely.

If the operated device 11 receives the matching candidate information from the server 13 at a time when being in a state of waiting for a determination of an operating terminal 12 by which the task is to be performed (operating terminal determination waiting step 804), the operated device 11 presents it to the device user. Then, the operated device 11 notifies the server 13 that the combination of the operating terminal 12 and the operated device 11 is determined, according to the selection or affirmation of the device user (step 805).

When receiving the notification of determining of the combination from the operated terminal 11, the server 13 updates the operating terminal information in the operating terminal information pool 62 according to the notification, and notifies the operating terminal 12 of the determined combination as the matching information (operating terminal information updating step 1005). The operating terminal 12 recognizes the contract to perform the task when receiving the matching information from the server 13 (step 902).

When the combination of the operating terminal 12 and the operated device 11 that operates the operating terminal 12 remotely is determined, the terminal operator operates the operated device 11 remotely from the operating terminal 12 to perform the task (step 903, 806).

A remote operation system according to another exemplary embodiment of the invention is a remote operation system for performing a task by remote operation, and the system may be configured to include:
an operated device connected to a communication network, for functioning in accordance with a remote operation via the communication network to perform the task;
an operating terminal connected to a communication network, for operating the operated device via the communication network;
and a server for holding operated side information about a request of a device user of the operated device to have the task performed, and operating side information about a request of a terminal operator of the operating terminal to perform the task, determining a combination of the operated device and the operating terminal that operates the operated device based on the operated side information and the operating side information, and notifying the operated device and the operating terminal of the combination.

The system may be configured such that: the operated device notifies the server of the operated side information indicating the task the device user desires to be performed; and
the server registers the operated side information notified from the operated device in a task information pool, and uses the operated side information registered in the task information pool when determining a combination of the operated device and the operating terminal that operates the operated device.

The server may be configured so as to register the operating side information about previous task performances by the operating terminal in an operating terminal information pool, and use the operating side information registered in the operating terminal information pool when determining a combination of the operated device and the operating terminal that operates the operated device.

The system may be configured such that the operating side information contains information about previous performance of the task experienced by the terminal operator of the operating terminal.

The system may be configured such that the operating side information contains information about evaluation of the terminal operator of the operating terminal received when the terminal operator performed the task previously.

The server may be configured to extract a candidate for the combination of the operated device and the operating terminal that operates the operated device, notify the operated device of the candidate, and determine the combination of the operated device and the operating terminal that operates the operated device in accordance with a response from the operated device.

The operated device may be configured to judge whether to have the task performed by the remote operation, and only when it is judged to have the task performed remotely, notify the server of the operated side information and request the server to determine the operating terminal for performing the task.

The operated device may be configured to have a predetermined task as an object to be judged whether to be performed by the remote operation.

The operated device may be configured to determine to have the task performed by the remote operation when it is impossible to perform the task autonomously.

The operated device may be configured to judge whether to have its own task performed by the remote operation by referring to a judgment result for other operated device about whether to have its task performed by the remote operation.

The operated device may be configured to anonymize the obtained device state information and transmit the information to the operating terminal when being operated remotely from the operating terminal.

The operated device may be configured to restrict the operational instruction information received from the operating terminal and uses the information for performing the task when being operated remotely from the operating terminal.

A server according to still another exemplary embodiment of the invention may be a server which provides a remote operation service for having the operated device perform the task by a remote operation from the operating terminal via a communication network, and the server may include:

- an operated side information recording unit for holding operated side information about a request to have the task performed, from a device user of an operated device which can operate and perform the task according to the remote operation via the communication network;
- an operating side information recording unit for holding operating side information about a request to perform the task, from a terminal operator of an operating terminal which can operate the operated device via the communication network; and
- a matching unit for determining a combination of the operated device and the operating terminal that operates the operated device based on the operated side information held by the operated side information recording unit and the operating side information held by the operating side information recording unit, and notifying the operated device and the operating terminal of the combination via the communication network.

An operated device according to still another exemplary embodiment of the invention may be a device which performs a task by operated remotely via a communication network from an operating terminal determined by a matching, and the operated device may include:

- a device state obtaining unit which obtains device state information about the device itself;
- a device state anonymization processing unit which anonymizes the device state information obtained by the device state obtaining unit and transmits it to the operating terminal;
- a remote operation restriction processing unit which restricts operational instruction information received from the operating terminal; and
- a device driving unit which drives a driving device according to the operational instruction information restricted by the remote operation restriction processing unit.

A remote operation service providing method according to still another exemplary embodiment of the invention may be a method of having the operated device perform the task by a remote operation from the operating terminal via a communication network, and the method may be configured such that:

- a server holds operated side information about a request to have the task performed, from a device user of an operated device which can operate and perform the task according to an remote operation via the communication network;
- the server holds operating side information about a request to perform the task, from a terminal operator of an operating terminal which can operate the operated device via the communication network; and
- the server determines a combination of the operated device and the operating terminal that operates the operated device based on the operated side information and the operating side information and notifies the operated device and the operating terminal of the combination via the communication network.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application claims the Priority right based on Japanese Patent Application No. 2007-124400 filed on May 9, 2007, and the disclosure thereof is hereby incorporated by reference in its entirety.

The invention claimed is:

1. A remote operation robot system for having a robot perform a task by remote operation, the system comprising:
    an operated device connected to a communication network, for functioning to perform the task in accordance with a remote operation via the communication network;
    an operating terminal connected to a communication network, for operating the operated device via the communication network;
    and a server for holding operated side information about a request, from a device user of the operated device, to have the task performed, and operating side information about a request, from a terminal operator of the operating terminal, to perform the task, determining a combination of the operated device and the operating terminal that operates the operated device based on the operated side information and the operating side information, and notifying the operated device and the operating terminal of the combination, wherein
    the operated device includes a device state obtaining unit for obtaining the device state measured by an input device which is at least either one of a camera, a microphone, an acceleration sensor, an ultrasonic sensor, an infrared sensor, and an RFID tag sensor, judges dynamically whether to perform the task autonomously or to have the task performed by the remote operation, and when it is judged to have the task performed remotely, notifies the server of the operated side information, requests the server to determine the operating terminal for performing the task, and transmits device state information obtained by the device state obtaining unit to the operating terminal for performing the task.

2. The remote operation system as claimed in claim 1, wherein the operated device determines to have the task performed by the remote operation when it is impossible to perform the task autonomously.

3. The remote operation system as claimed in claim 1, wherein the operated device judges whether to have its own task performed by the remote operation by referring to a judgment result for other operated device about whether to have its task performed by the remote operation.

4. The remote operation system as claimed in claim 2, wherein the server registers the operated side information transmitted from the operated device in a task information pool, and uses the information registered in the task information pool when determining the combination of the operated device and the operating terminal.

5. The remote operation system as claimed in claim 2, wherein the server registers information about previous task performances of the operating terminal in an operating terminal information pool, and uses the information registered in the operating terminal information pool when determining the combination of the operated device and the operating terminal.

6. The remote operation system as claimed in claim 5, wherein the operating side information contains information about previous performance of the task experienced by the terminal operator of the operating terminal.

7. The remote operation system as claimed in claim 6, wherein the operating side information contains information about evaluation of the terminal operator of the operating terminal received when the terminal operator performed the task previously.

8. The remote operation system as claimed in claim 2, wherein the operated device has a predetermined task as an object to be judged whether to be performed by the remote operation.

9. The remote operation system as claimed in claim 2, wherein the operated device anonymizes the obtained device state information and transmits the information to the operating terminal when being operated remotely from the operating terminal.

10. The remote operation system as claimed in claim 2, wherein the operated device restricts the operational instruction information received from the operating terminal and uses the information for performing the task when being operated remotely from the operating terminal.

11. A remote operation robot service method for having a robot perform a task by remote operation, the method comprising:

arranging two or more operating terminals and two or more operated devices to be accessible to a server via the communication network;

transmitting information requesting to perform a task of the operated device from the operating terminal to the server; wherein the operated device includes a device state obtaining unit for obtaining the device state measured by an input device which is at least either one of a camera, a microphone, an acceleration sensor, an ultrasonic sensor, an infrared sensor, and an RFID tag sensor, judges dynamically whether to perform the task autonomously or to have the task performed by the remote operation, transmitting information requesting to have a task of the operated device performed from the operated device to the server; and when the system judges to have the task performed by the remote operation, notifying the server of the operated information from the operated device to request the server to determine the operating terminal for performing the task, and transmitting device state information obtained by the device state obtaining unit to the operating terminal for performing the task, having the server manage information transmitted from the two or more operated devices and the two or more operating terminals, having the server select a combination of one operated device and one operating terminal suitable for each other based on the information, and relaying the one operated device and the one operating terminal.

12. The remote operation service method as claimed in claim 11, comprising having the operated device determine to have the task performed by the remote operation when it is impossible to perform the task autonomously.

13. The remote operation service method as claimed in claim 11, comprising having the operated device judge whether to have its own task performed by the remote operation by referring to a judgment result for other operated device about whether to have its task performed by the remote operation.

14. A remote operation robot system for having a robot perform a task by remote operation, the system comprising:

operated means connected to a communication network, for functioning to perform the task in accordance with a remote operation via the communication network;

operating means connected to a communication network, for operating the operated device via the communication network;

and server means for holding operated side information about a request, from a device user of the operated means, to have the task performed, and operating side information about a request, from a terminal operator of the operating means, to perform the task, determining a combination of the operated means and the operating means that operates the operated means based on the operated side information and the operating side information, and notifying the operated means and the operating means of the combination, wherein the operated means includes device state obtaining means for obtaining the device state measured by an input device which is at least either one of a camera, a microphone, an acceleration sensor, an ultrasonic sensor, an infrared sensor, and an RFID tag sensor, judges dynamically whether to perform the task autonomously or to have the task performed by the remote operation, and when it is judged to have the task performed remotely, notifies the server of the operated side information, requests the server to determine the operating means for performing the task, and transmits device state information obtained by the device state obtaining means to the operating means for performing the task.

* * * * *